(12) United States Patent
Yamakawa et al.

(10) Patent No.: US 7,242,967 B2
(45) Date of Patent: Jul. 10, 2007

(54) INFORMATION PROVIDING APPARATUS, ITEM SALES DATA PROCESSOR, STORAGE MEDIUM STORING COMPUTER PROGRAM AND COMPUTER PROGRAM

(75) Inventors: Masato Yamakawa, Numazu (JP); Yoshinori Nishijima, Ito (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 982 days.

(21) Appl. No.: 10/096,278

(22) Filed: Mar. 13, 2002

(65) Prior Publication Data

US 2002/0159088 A1 Oct. 31, 2002

(30) Foreign Application Priority Data

Apr. 25, 2001 (JP) ............................. 2001-127225

(51) Int. Cl.
*H04B 1/38* (2006.01)
*H04M 1/00* (2006.01)
(52) U.S. Cl. .......................... 455/566; 705/26; 705/27; 345/1.1
(58) Field of Classification Search ............. 455/414.1, 455/466, 566; 705/26–27, 64; 345/1.1–2.3
See application file for complete search history.

(56) References Cited

U.S. PATENT DOCUMENTS

2001/0018666 A1* 8/2001 Sugiyama et al. ............ 705/14

2002/0161670 A1* 10/2002 Walker et al. ................ 705/26

FOREIGN PATENT DOCUMENTS

| JP | 10-214380 | 8/1998 |
|----|-----------|--------|
| JP | 11-25114 | 1/1999 |
| JP | 2001-008254 | 1/2001 |
| JP | 2001-283117 | 10/2001 |

* cited by examiner

*Primary Examiner*—Joseph Feild
*Assistant Examiner*—Jaime Holliday
(74) *Attorney, Agent, or Firm*—Oblon, Spivak, McClelland, Maier & Neustadt, P.C.

(57) ABSTRACT

The present invention allows a mobile terminal which has transmitted a display application command to control a display and thereby lends the display application right to the mobile terminal when a display application command is included in a transmission command transmitted from the mobile terminal obtained via a wireless module by an apparatus such as POS terminal or the like which is provided with the wireless module for enabling transmission and reception of information via a radio link to and from the mobile terminal in order to display various information pieces on the display. Thereby, a user of the mobile terminal can display the desired information on the display of the apparatus such as POS terminal and a shop having installed such apparatus therein can enhance the customer gathering capability.

10 Claims, 4 Drawing Sheets

INFORMATION PROVIDING APPARATUS, ITEM SALES DATA PROCESSOR, STORAGE MEDIUM STORING COMPUTER PROGRAM AND COMPUTER PROGRAM

BACKGROUND OF THE INVENTION

1. Field of the Invention

The present invention relates to an information providing apparatus for displaying various pieces of information on a display, an item sales data processor including a customer-side display, a storage medium for storing a computer program and a computer program.

2. Discussion of the Background

An item sales data processor such as ECR and POS terminal, etc. is generally provided with a customer-side display, and the sales data of the items purchased by a customer are displayed on the customer-side display for processing the sales data of the items purchased by the customer.

Such customer-side display tends to be increased, in recent years, in size of the display screen through employment of a liquid crystal display or the like. Therefore, customers can more easily watch the displayed contents of the customer-side display. In addition, it is also realized in current to display commercial messages or contents on the customer-side display by fully utilizing the merits of a large size display screen.

Moreover, in these years, an information providing apparatus provided with a display is often installed, for example, in convenience stores or the like in order to provide various services to customers by displaying various information pieces on the display. Such information providing apparatus can provide versatile information pieces such as item information and event information or the like to customers depending on the operations by customers.

From the viewpoint of customers, information generated from an item sales data processor or information providing apparatus such as ECR or POS terminal installed in the shops can be represented only by the settlement data or the information exclusively selected by shops (for example, commercial data or news or the like). Such information is very significant from the shop side as the sales promotion information but is only the one-way information from the customer side.

SUMMARY OF THE INVENTION

Accordingly, an object of the present invention is to provide, to customers, application of a more attractive information providing apparatus and item sales data processor for customers in view of improving customer gathering capability of shop where such apparatus is installed.

The object of the present invention is achieved by the novel information providing apparatus, item sales data processor including a customer-side display, storage medium for storing a computer program, and computer program.

According to the novel information providing apparatus of the present invention, the information providing apparatus comprises: a display for displaying variety of information pieces; a wireless module for enabling transmission and reception of information to and from a mobile terminal through a radio link; a judging means for judging whether a display application command is included or not in a transmission command transmitted from the mobile terminal obtained via the wireless module; and an application right lending means for controlling, when the judging means has judged that a display application command is included in a transmission command transmitted from the mobile terminal, the display from the mobile terminal which has transmitted the display application command. Therefore, the display application right is lent to the mobile terminal by transmitting and receiving the information through the radio link. A user of the mobile terminal can display the desired information on the display of the information providing apparatus by manipulating the mobile terminal.

Moreover, according to the novel item sales data processor provided with a customer-side display of the present invention, the item sales data processor comprises: a means for displaying sales data of items to be purchased by a customer on the customer-side display and processing such sales data of the items purchased by a customer; a wireless module for enabling transmission and reception of the information to and from a mobile terminal through the radio link; a judging means for judging whether a display application command is included or not in a transmission command transmitted from the mobile terminal obtained via the wireless module; and an application right lending means for controlling, when the judging means has judged that the display application command is included in the transmission command transmitted from the mobile terminal, the customer-side display from the mobile terminal which has transmitted such display application command. Therefore, the application right of customer-side display is lent to the mobile terminal by transmitting and receiving the information through the radio link. Accordingly, a user of the mobile terminal can display the desired information on the customer-side display of the item sales data processor by manipulating the mobile terminal.

Moreover, according to the novel storage medium for storing a computer program of the present invention, the storage medium is installed to an information providing apparatus including a wireless module for enabling transmission and reception of information to and from a mobile terminal through the radio link in order to display versatile information pieces on the display, and controls this information providing apparatus to respectively operate a judging means for judging whether a display application command is included or not in a transmission command transmitted from the mobile terminal obtained through the wireless module and an application right lending means for controlling, when the judging means has judged that the display application command is included in the transmission command transmitted from the mobile terminal, the display from the mobile terminal which has transmitted the display application command. Therefore, the display application right is lent to the mobile terminal. Accordingly, a user of the mobile terminal can display the desired information on the display of the information providing apparatus.

Moreover, according to the novel storage medium for storing a computer program of the present invention, the storage medium is installed to an item sales data processor for displaying sales data of the items to be purchased by a customer on the customer-side display in order to process the sales data of the items purchased by a customer, and controls this item sales data processor to respectively operate a judging means for judging whether a display application command is included or not in a transmission command transmitted from a mobile terminal obtained via a wireless module which enables transmission and reception of an information to and from the mobile terminal through the radio link and an application lending means for controlling, when the judging means has judged that the display application command is included in the transmission command transmitted from the mobile terminal, the customer-side display from the mobile terminal which has transmitted the display application command. Therefore, the application right of customer-side display is lent to the mobile terminal by transmission and reception of the information through the radio link. Accordingly, a user of the mobile terminal can display the desired information on the customer-side display of the item sales data processor by manipulating the mobile terminal.

Moreover, according to the novel computer program of the present invention, the computer program is installed to an information providing apparatus of the computer construction comprising a wireless module to realize transmission and reception of information to and from a mobile terminal through the radio link and displaying versatile information pieces on a display, and controls this information providing apparatus to respectively operate a judging means to judge whether a display application command is included or not in a transmission command transmitted from a mobile terminal obtained via the wireless module and an application right lending means for controlling, when the judging means has judged that the display application command is included in the transmission command transmitted from the mobile terminal, the display from the mobile terminal which has transmitted the display application command. Therefore, the display application right is lent to the mobile terminal by transmitting and receiving information through the radio link. Accordingly, a user of mobile terminal can display the desired information on the display of information providing apparatus by manipulating the mobile terminal.

Moreover, according to the novel computer program of the present invention, the computer program is installed to an item sales data processor which displays the sales data of the items to be purchased by a customer on the customer-side display and processes the sales data of the items purchased by a customer, and controls this item sales data processor to respectively operate a wireless module for enabling transmission and reception of information to and from a mobile terminal through the radio link, a judging means for judging whether a display application command is included or not in a transmission command transmitted from the mobile terminal obtained via the wireless module and an application right lending means for controlling, when the judging means has judged that the display application command is included in the transmission command transmitted from the mobile terminal, the customer-side display from the mobile terminal which has transmitted the display application command. Therefore, the application right of customer-side display is lent to the mobile terminal by transmitting and receiving information through the radio link. Accordingly, a user of the mobile terminal can display the desired information on the customer-side display of the item sales data processor by manipulating the mobile terminal.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

A preferred embodiment of the present invention will be explained with reference to FIG. 1 to FIG. 4.

The preferred embodiment of the present invention is an example of application into a POS terminal 101 as an item sales data processor and an example of application into a mobile telephone 201 as a mobile terminal.

Moreover, the POS terminal 101 is only an example of the item sales data processor but this POS terminal also functions as an information providing terminal. The information providing terminal is generally formed of another apparatus different from the POS terminal 101 and is installed within a shop but may also be formed as the POS terminal 101.

Figure 1:
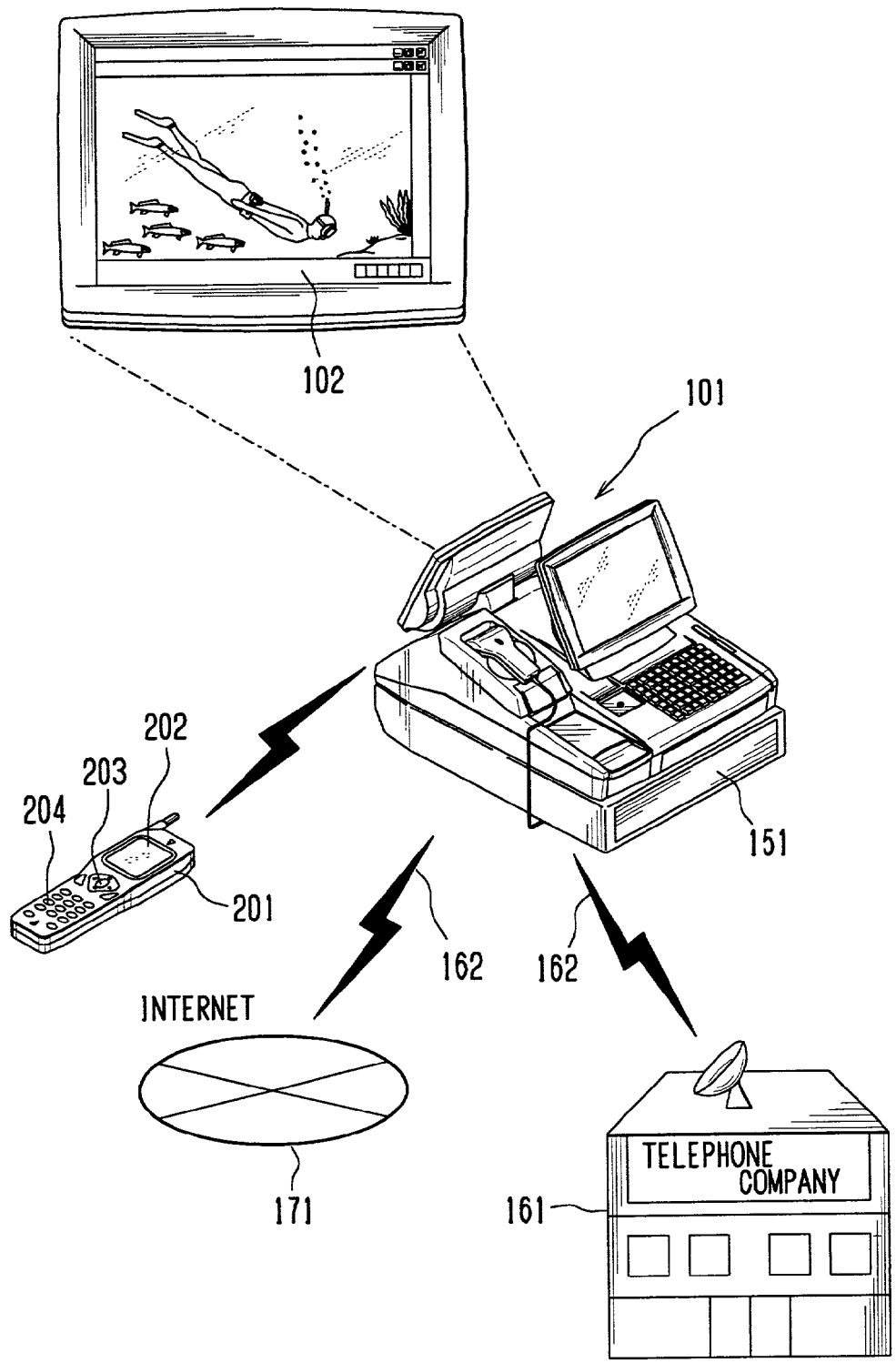
FIG. 1 is a schematic diagram showing, as a preferred embodiment of the present invention, a total system configuration including an item sales data processor (POS terminal) and a mobile terminal (mobile telephone)

FIG. 1 is a perspective view of a total system configuration including the POS terminal 101 and the mobile telephone 201. The POS terminal 101 placed on a drawer 151 is provided with a customer-side display 102 in the rear side thereof as the display in the customer side. This customer-side display 102 is a flat panel formed of a liquid crystal display apparatus. The mobile telephone 201 does not include the special design as the basic external configuration and comprises a display 202, a command key 203 and a ten-key section 204.

Both POS terminal 101 and mobile telephone 201 of which external designs are shown in FIG. 1 are provided with a radio communication function conforming to the common specification. As the specification of such radio communication function, the Bluetooth, for example, is employed. Moreover, the other specification may also be employed as the radio communication function of the POS terminal 101 and mobile telephone 201.

Figure 2:
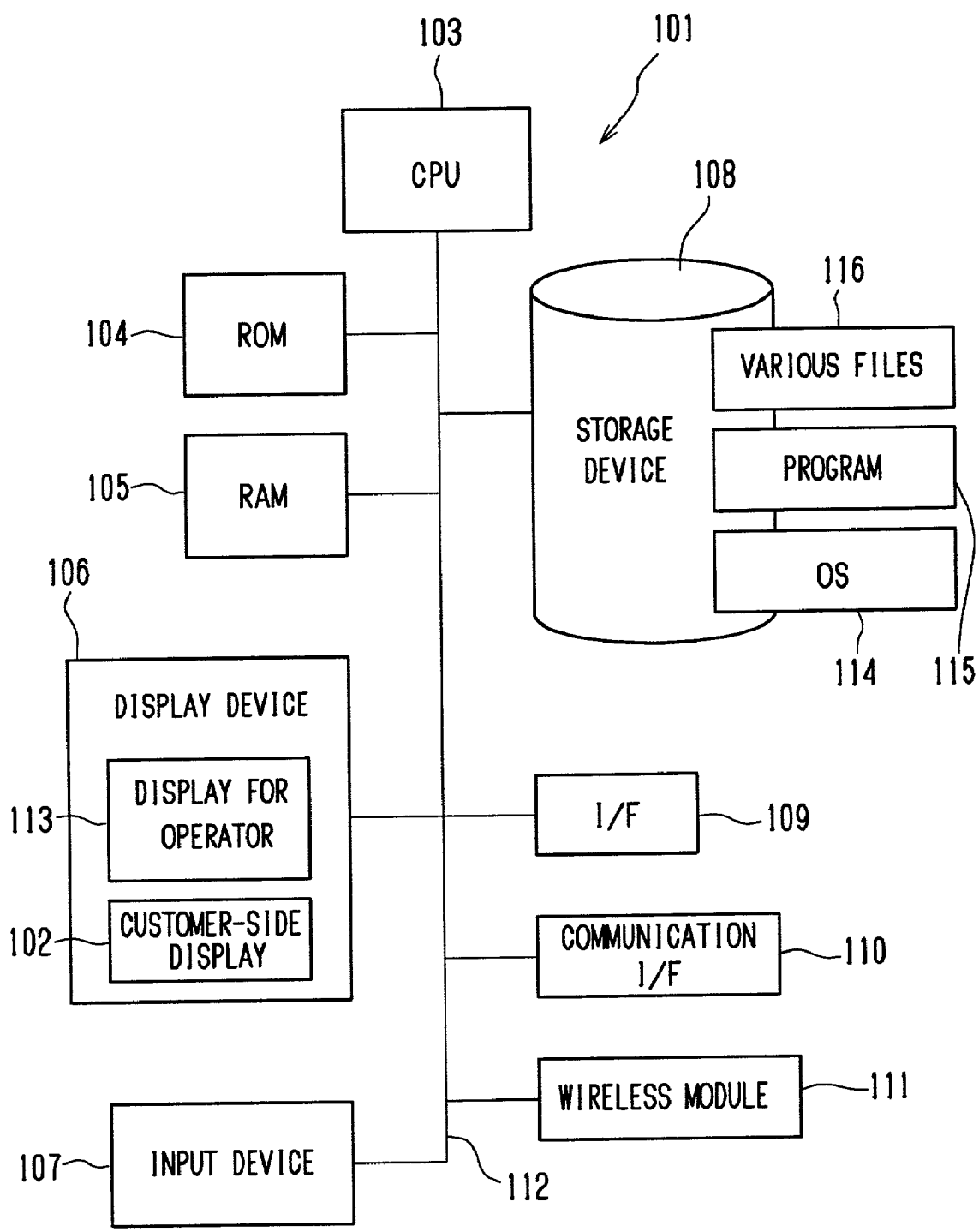
FIG. 2 is a block diagram showing a hardware configuration of the item sales data processor (POS terminal)

FIG. 2 is a block diagram showing a hardware configuration of the POS terminal 101.

The POS terminal 101 is schematically configured by connecting a ROM 104 for storing fixed data, a RAM 105 for storing programmable and variable data, display devices 106 for displaying variety of data, an input device 107 for inputting various data, a storage device 108, an interface 109, a communication interface 110 and a wireless module 111 to a CPU 103 for centralized control of these devices through execution of various arithmetic operations via a system bus 112.

Here, the display devices 106 includes a display 113 for an operator and a customer-side display 102 of which external design is illustrated in FIG. 1 as an example.

As the storage device 108, a hard disc drive, for example, is used. To this storage device 108, a program 115 and various files 116 are installed in addition to an operating system (hereinafter, referred to as OS 114). These OS 114, program 115 and various files 116 are installed from an external device such as a store controller or the like (not illustrated) connected to the communication interface 110, for example, via LAN. As a program 115 installed as explained above, a program for item sales data process is installed to the POS terminal 101 of this embodiment. In this sense, the storage device 108 functions as a storage medium for storing the program 115.

The OS 114, program 115 and various files 116 installed to the storage device 108 are totally or partly copied to the RAM 105 when the POS terminal 101 is driven or when the program 115 is driven to realize high speed access.

Here, the POS terminal 101 is provided with a construction to be connected to the LAN environment (not illustrated) as the communication interface 110 and a construction to be connected to the telephone line network 162 provided from telephone companies 161. Namely, the POS terminal 101 includes a network card (not illustrated) as the construction to be connected to the LAN environment and a modem (not illustrated) as the construction to be connected to the telephone line network 162. The program or private program 115 included in the OS 114 supports connection to the LAN environment and connection to the telephone line network 162, the POS terminal 101 functions as a client PC in the LAN environment and realizes connection to the Internet 171 when it is connected to the telephone line network 162. In this case, the public line network may also be used as the telephone line network 162 but it is preferable to use a private line. Here, the Internet 171 means a virtual space which may be accessed via the telephone line network 162 and such virtual space is generally formed by a file called a web page which is described, for example, with the HTML language.

Moreover, a browsing software which is provided with a function to browse a web page provided on the Internet 171 is installed, as a program 115, to the storage device 108 of the POS terminal 101.

Thereby, the POS terminal 101 can be provided with an architecture which can execute the function of the Internet means for browsing web pages through the connection to the Internet 171.

The POS terminal 101 of this embodiment executes the item sales data processes under the control of the CPU 103 conforming to the program 115 which is stored in the storage device and is totally or partly copied to the RAM 105 when the POS terminal 101 is driven. Namely, as an example of the processes, an item code inputted from the input device 107, unit price information and quantity information searched based on this item code are temporarily stored to a cache area of the RAM 105 in order to obtain a sub-total and a transaction information of such transaction temporarily stored in the cache area of the RAM 105 through the closing input from the input device 107 is registered to a sales registration file (not illustrated) included in the various files 116. These processes are only examples of the item sales data processes and do not prevent employment of the other processing method for embodying the present invention.

The POS terminal 101 also functions as an information providing terminal using its customer-side display 102. As an example of the functions as the information providing terminal, various commercial images distributed from host apparatus through the LAN network not illustrated are displayed on the customer-side display 102.

Figure 3:
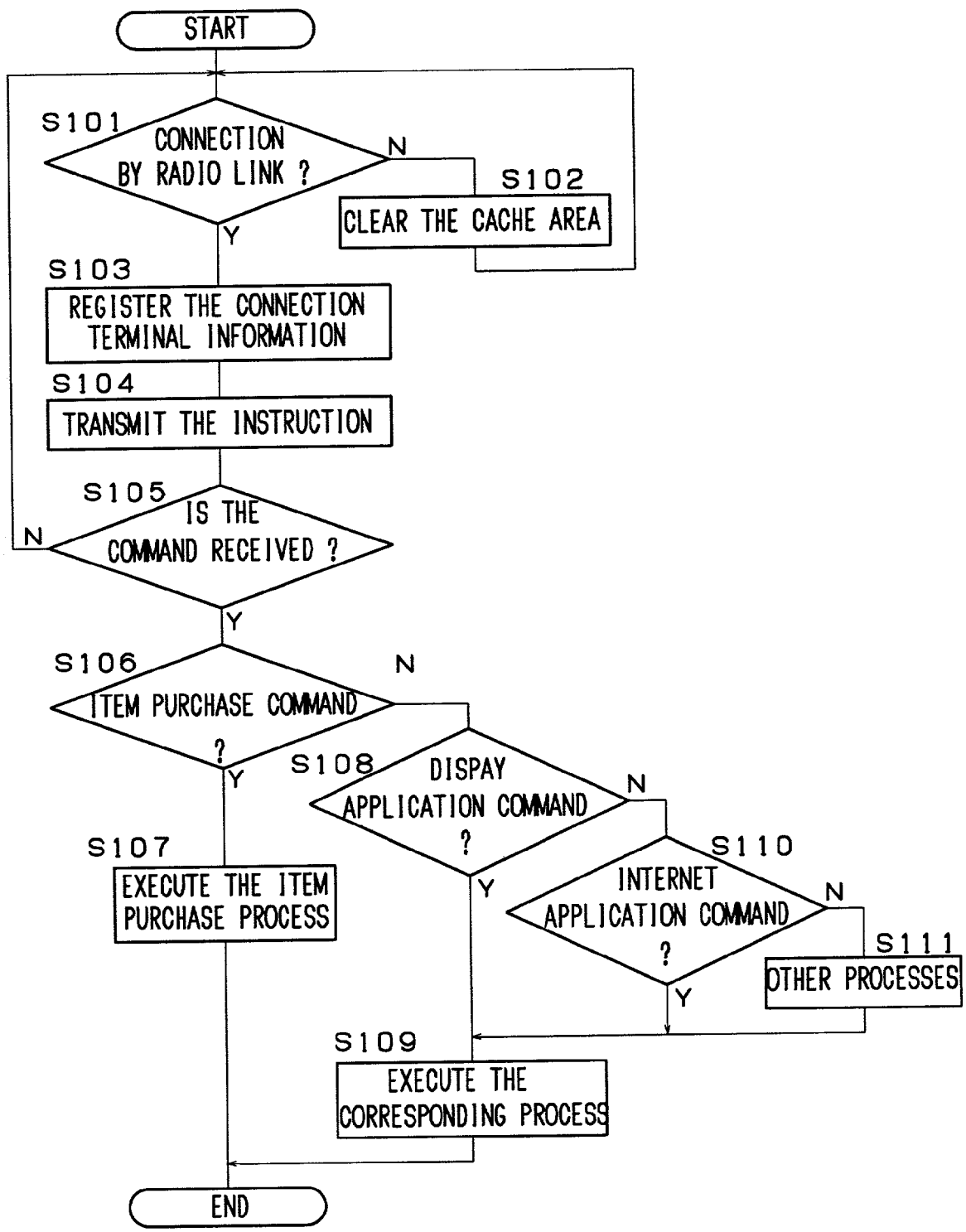
FIG. 3 is a flowchart showing the process contents depending on a command transmitted by a radio link from a mobile terminal (mobile telephone) of the item sales data processor (POS terminal)

FIG. 3 is a flowchart showing an example of contents of processes executed by the POS terminal 101. As explained above, the POS terminal 101 of this embodiment has the radio communication function for mobile telephones 201 conforming, for example, to the Bluetooth specification. Such radio communication function is realized with a wireless module 111. FIG. 3 shows an example of the processes which are executed using the radio communication function of the POS terminal 101 under the control of the CPU 103 conforming to the program 115 stored in the storage device 108 and totally or partly copied to the RAM 105 when the POS terminal 101 is driven.

First, the POS terminal 101 is waiting for judgment to determine whether the connection by radio is already set or not (step S101). In this embodiment, since the Bluetooth specification is employed, when the mobile telephone 201 conforming to the Bluetooth specification comes close to the POS terminal 101, the wireless module 111 automatically starts connection process by radio to the mobile telephone 201. The program 115 is waiting, in the predetermined period, for judgment to determine whether the connection by radio is set up or not (step S101).

When it is judged that the connection by radio is set up (Y in the step S101), a radio connection information is temporarily stored in the cache area of the RAM 105 (step S103) In this case, the radio connection information is used to identify the mobile telephone 201 connected by radio. Meanwhile, when it is judged that the connection by radio is no longer set up for the mobile telephone 201 which has been once connected by radio (N in the step S101), the radio connection information for the mobile telephone 201 which has been once stored temporarily to the cache area of the RAM 105 is cleared (step S102) to wait for judgment whether connection by radio is set up or not (step S101). In the case where the connection by radio is not set up from the beginning, there is no radio connection information to be cleared. Therefore, the POS terminal 101 waits for judgment whether the connection by radio is set up or not (step S101) without execution of the process for clearing the cache area (step 102).

Subsequently, when it is judged that the connection by radio is set up (Y in the step S101) and the radio connection information is temporarily stored in the cache area of the RAM 105 (step S103), an instruction is transmitted as a manipulation instruction to the mobile telephone 201 connected by radio utilizing the radio transmission function of the wireless module 111 (step S104). This instruction is displayed, by the radio transmission function of the mobile telephone 201, on the display 202 thereof under the correspondence between a list of the executable items and contents of command manipulation for execution of each item. Therefore, an operator of the mobile telephone 201 executes the desired manipulation conforming to such instruction.

Here, the program 115 generates an instruction by referring to a file among various files 116 showing correspondence between each command and a signal transmitted from the mobile telephone 201 through manipulation thereof. In this case, the signal transmitted from the mobile telephone 201 means a signal which is generally generated by an ordinary manipulation of the mobile telephone 201 such as a signal transmitted from the mobile telephone 201 through manipulation, for example, of numeral keys, asterisk(*) key or sharp (#) key included in the ten-key 204 or a signal transmitted from the mobile telephone 201 through manipulation of the command key 203. Therefore, the program 115 assigns the commands to the signals which are generally generated through ordinary manipulation of the mobile telephone 201 for instructing execution of the processes to be executed by the program 115.

The POS terminal 101 waits for judgment to determine whether a command is received or not (step S105) as the process following the transmission of the instruction (step S104). When an operator of the mobile telephone 201 executes the manipulation for transmitting by radio the command depending on the instruction transmitted to the mobile telephone 201 through the process in the step S104, the POS terminal 101 judges that the command is received (Y in the step S105) and judges a kind of command by referring to a file among various files 116 indicating correspondence between each command and signal transmitted from the mobile telephone 201 through manipulation thereof (steps S106, S108, S110).

Here, the functions of the judging means are executed for judging whether the display application command is included or not in the transmission command transmitted from the mobile terminal 201 obtained via the wireless module 111 (step S108) or whether the Internet command is included or not therein (step S110).

When the command transmitted from the mobile telephone 201 is the item purchase command (Y in the step S106), the item purchase process is executed (step S107). This process is executed, for example, in the case where an operator of the mobile telephone 201 purchases items through an automatic vending machine.

On the other hand, when the command transmitted from the mobile telephone 201 is the display application command (Y in the step S108), the process corresponding to this command is executed (step S109). That is, the CPU 103 of the POS terminal 101 develops the information to be displayed on the display 202 of the mobile telephone 201 transmitted by radio from the mobile telephone 201 via the wireless module 111 into a video memory (not illustrated) which is comprehended in the concept of RAM 105 and controls the drive of a controller (not illustrated) for driving and controlling the customer-side display 102 of the display device 106 depending on the video information developed in the video memory. Accordingly, the information to be displayed on the display 202 of the mobile telephone 201 can be displayed on the customer-side display 102 of the POS terminal 101. Here, the function of the application right lending means is executed.

As the information which is displayed by the mobile telephone 201 on the customer-side display 102, various information pieces stored in the mobile telephone 201 itself may be assumed but the information which the mobile telephone 201 has obtained from the virtual space such as the Internet with its web page browse function can also be displayed on the customer-side display 102 in this embodiment. Accordingly, the information which is difficult for an operator to understand its contents through the display operation on the display 202 of the mobile telephone 201 and the information which is suitable for browsing on a large size display can be displayed in a large size on the customer-side display 102.

On the other hand, the command transmitted from the mobile telephone 201 is the command using the Internet (Y in the step S110), the process corresponding to this command is executed (step S109). Namely, the CPU 103 of the POS terminal 101 connects the POS terminal 101 to the Internet 171 utilizing the telephone line network 162 depending on the command transmitted by radio and the URL information from the mobile telephone 201 via the wireless module 111. Thereby, the URL transmitted from the mobile telephone 201 is connected to the designated web page and its contents are displayed on the customer-side display 102. The CPU 103 executes the change-over of web page displayed on the customer-side display 102 and operations on the web page depending on the command from the mobile telephone 201. Here, the function of the application right lending means can be executed.

Here, in this embodiment, two kinds of method using the web connection function of the mobile telephone 201 itself and controlling the mobile telephone 201 to execute the Internet means of the POS terminal 101 can be used selectively as the method for displaying the web page on the customer-side display 102. An operator of the mobile telephone 201 can select the method for displaying the web page on the customer-side display 102.

When the command transmitted from the mobile telephone 201 is neither the item purchase command (N in the step S107) nor the display application command (N in the step S108) and the Internet application command (N in the step S110), the process corresponding to such command is executed (step S111).

In any case, according to the embodiment of the present invention, the application right of the customer-side display 102 of the POS terminal 101 and the Internet means can be lent to the mobile telephone 201. Accordingly, an operator of the mobile telephone 201 is capable of displaying the desired information on the customer-side display 102 and realizing the browse of the desired web page on the same customer-side display 102. As a result, the customer gathering force of the shop where the POS terminal 101 is installed can be enhanced.

Figure 4:
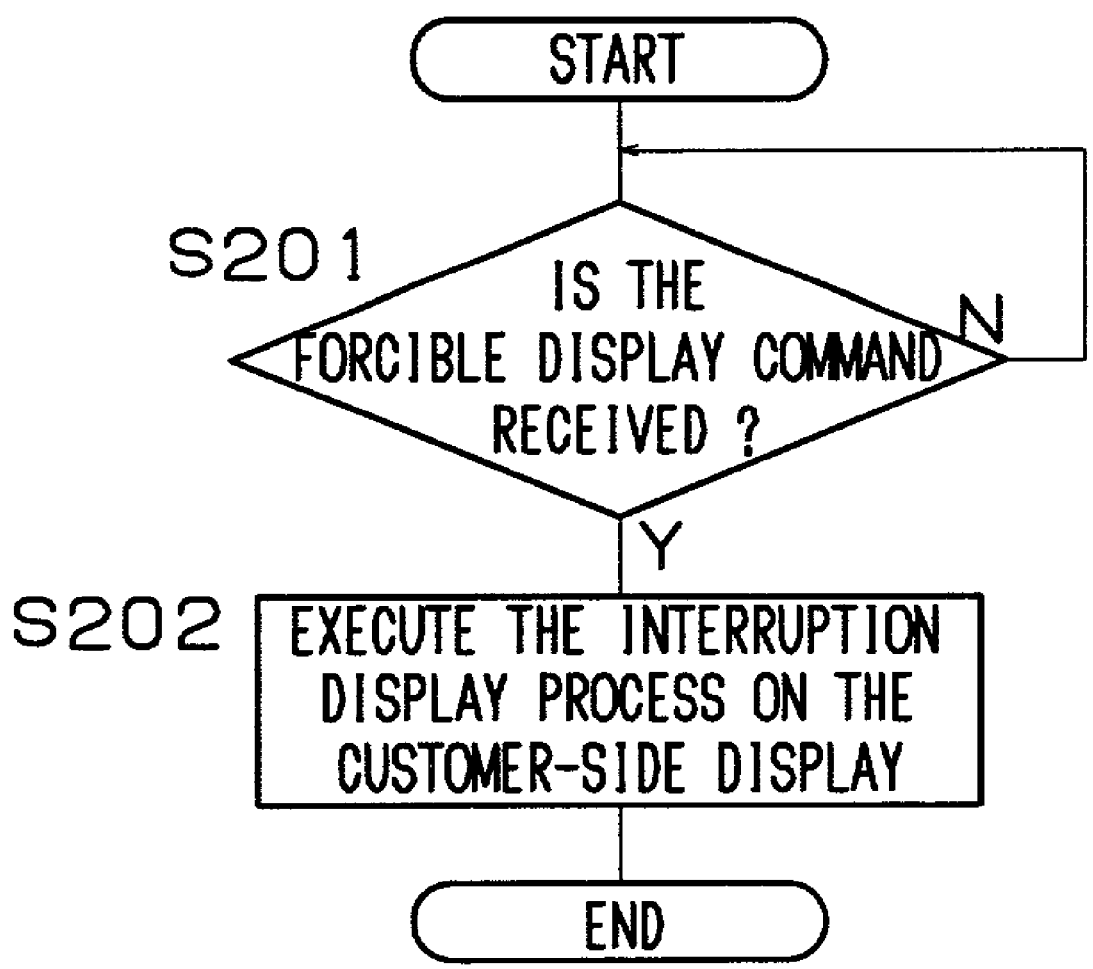
FIG. 4 is a flowchart showing the contents of forcible display process by the item sales data processor (POS terminal).

FIG. 4 is a flowchart showing contents of the forcible display process by the POS terminal 101. The POS terminal 101 receives the display application command or the Internet application command from the mobile telephone 201 (Y in the step S108, Y in the step S110) and waits for reception of the forcible display command (step S201) during the execution of the corresponding process (step S109). This process is executed for every specified timing. This forcible display command is generated from the CPU 103, for example, depending on the program 115 or received from an external device via the LAN network (not illustrated) via the communication interface 110.

When the forcible display command is received (Y in the step S201), the CPU 103 executes an interruption display process to the customer-side display 102 (step S202). Here, the interruption display has the contents, for example, of a bargain sale item information and commercial message, etc. In any case, it is preferable for such interruption display that the display contents do not interfere the contents displayed on the customer-side display 102 depending on the request from an operator of the mobile telephone 201. Here, the function of forcible display means can be executed.

As explained above, according to the embodiment of the present invention, even when an operator of the mobile telephone 201 displays the desired display images on the customer-side display 102, the predetermined information, for example, the information such as particular item information or commercial message of the service which is prepared by the shop to display for the customers can be displayed in forcible on the customer-side display 102. Accordingly, sales activity of various items can be promoted by simultaneously providing the information prepared by the shop to the customers while giving the sense of satisfaction to the customers by actively providing the information which the customers desire to know.

Obviously, numerous modifications and variations of the present invention are possible in light of the above teachings. It is therefore to be understood that within the scope of the appended claims, the invention may be practiced otherwise than as specifically described herein.

What is claimed is:

1. An information providing apparatus, comprising:
   a customer-side display for displaying various information pieces;

a wireless module for enabling transmission and reception of information via a radio link to and from a mobile terminal having a terminal display;

judging means for judging whether a display application command is included or not in a transmission command transmitted from the mobile terminal obtained via the wireless module;

application right lending means for controlling, when the judging means has judged that the display application command is included in the transmission command transmitted from the mobile terminal, the customer-side display from the mobile terminal which has transmitted the display application command so as to display the information to be displayed on both the customer-side display and the terminal display; and an Internet means for browsing of web pages on an Internet network through connection thereto, wherein the judging means judges whether an Internet application command is included or not in the transmission command transmitted from the mobile terminal obtained through the wireless module, and the application right lending means controls, when the judging means has judged that the Internet application command is included in the transmission command transmitted from the mobile terminal, the Internet means from the mobile terminal which has transmitted the Internet application command, and wherein the display application command is an Internet application.

2. An information providing apparatus according to claim 1, further comprising forcible display means for realizing forcible display of the predetermined information on the customer-side display while the application right lending means gives the right of display to the customer-side display.

3. An information providing apparatus according to claim 1, further comprising forcible display means for realizing forcible display of the predetermined information on the customer-side display while the application right lending means gives the right of display to the customer-side display.

4. An item sales data processor, comprising:

means for displaying sales data of items to be purchased by a customer on a customer-side display and processing the sales data of the items purchased by a customer;

a wireless module for enabling transmission and reception of information via a radio link to and from a mobile terminal having a terminal display;

judging means for judging whether a display application command is included in a transmission command transmitted from a mobile terminal obtained via the wireless module;

application right lending means for controlling, when the judging means has judged that the display application command is included in the transmission command transmitted from the mobile terminal, the customer-side display from the mobile terminal which has transmitted the display application command so as to display the information to be displayed on both the customer-side display and the terminal display; and an Internet means for browsing of web pages on an Internet network through connection thereto, wherein the judging means judges whether an Internet application command is included or not in the transmission command transmitted from the mobile terminal obtained through the wireless module, and the application right lending means controls, when the judging means has judged that the Internet application command is included in the transmission command transmitted from the mobile terminal, the Internet means from the mobile terminal which has transmitted the Internet application command.

5. An item sales data processor according to claim 4, further comprising forcible display means for realizing forcible display of the predetermined information on the customer-side display while the application right lending means gives the right of display to the customer-side display.

6. An item sales data processor according to claim 4, further comprising forcible display means for realizing forcible display of the predetermined information on the customer-side display while the application right lending means gives the right of display to the customer-side display.

7. A storage medium for storing a computer program installed to an information providing apparatus which includes a wireless module for enabling transmission and reception of information via a radio link to and from a mobile terminal having a terminal display to display various information pieces on a customer-side display, comprising:

judging means which is operated by the information providing apparatus depending on the computer program for judging whether a display application command is included or not in a transmission command transmitted from the mobile terminal obtained via the wireless module;

application right lending means which is also operated by the information providing apparatus depending on the computer program for controlling, when the judging means has judged that the display application command is included in the transmission command transmitted from a mobile terminal, the customer-side display from the mobile terminal which has transmitted the display application command so as to display the information to be displayed on both the customer-side display and the terminal display; and an Internet means for browsing of web pages on an Internet network through connection thereto, wherein the judging means judges whether an Internet application command is included or not in the transmission command transmitted from the mobile terminal obtained through the wireless module, and the application right lending means controls, when the judging means has judged that the Internet application command is included in the transmission command transmitted from the mobile terminal, the Internet means from the mobile terminal which has transmitted the Internet application command, and wherein the display application command is an Internet application.

8. A storage medium for storing a computer program installed to an item sales data processor for displaying sales data of items to be purchased by a customer on a customer-side display and processing the sales data of the items purchased by a customer, comprising:

judging means which is operated by the item sales data processor depending on the computer program for judging whether a display application command is included or not in a transmission command transmitted from a mobile terminal having a terminal display obtained via a wireless module for enabling transmission and reception of information via a radio link to and from a mobile terminal;

application right lending means which is also operated by the item sales data processor depending on the computer program for controlling, when the judging means has judged that the display application command is included in the transmission command transmitted from the mobile terminal, a customer-side display from the mobile terminal which has transmitted the display application command so as to display the information to be displayed on both the customer-side display and the terminal display; and an Internet means for browsing of web pages on an Internet network through connection thereto, wherein the judging means judges whether an Internet application command is included or not in the transmission command transmitted from the mobile terminal obtained through the wireless module, and the application right lending means controls, when the judging means has judged that the Internet application command is included in the transmission command transmitted from the mobile terminal, the Internet means from the mobile terminal which has transmitted the Internet application command, and wherein the display application command is an Internet application.

9. A computer readable medium encoded with a computer program encoded to be installed to an information providing apparatus including a wireless module for enabling transmission and reception of information via a radio link to and from a mobile terminal having a terminal display for displaying various information pieces on a customer-side display, comprising:

judging means which is operated by the information providing apparatus for judging whether a display application command is included or not in a transmission command transmitted from the mobile terminal obtained via the wireless module;

application right lending means which is also operated by the information providing apparatus for controlling, when the judging means has judged that the display application command is included in the transmission command transmitted from the mobile terminal, the customer-side display from the mobile terminal which has transmitted the display application command so as to display the information to be displayed on both the customer-side display and the terminal display; and an Internet means for browsing of web pages on an Internet network through connection thereto, wherein the judging means judges whether an Internet application command is included or not in the transmission command transmitted from the mobile terminal obtained through the wireless module, and the application right lending means controls, when the judging means has judged that the Internet application command is included in the transmission command transmitted from the mobile terminal, the Internet means from the mobile terminal which has transmitted the Internet application command, and wherein the display application command is an Internet application.

10. A computer readable medium encoded with a computer program to be installed to an item sales data processor for displaying sales data of items to be purchased by a customer on a customer-side display and processing the sales data of the items purchased by a customer, comprising:

judging means which is operated by the item sales data processor for judging whether a display application command is included or not in a transmission command transmitted from a mobile terminal having a terminal display obtained via a wireless module for enabling transmission and reception of information via a radio link to and from the mobile terminal;

application right lending means which is also operated by the item sales data processor for controlling, when the judging means has judged that the display application command is included in the transmission command transmitted from the mobile terminal, a customer-side display from the mobile terminal which has transmitted the display application command so as to display the information to be displayed on both the customer-side display and the terminal display; and an Internet means for browsing of web pages on an Internet network through connection thereto, wherein the judging means judges whether an Internet application command is included or not in the transmission command transmitted from the mobile terminal obtained through the wireless module, and the application right lending means controls, when the judging means has judged that the Internet application command is included in the transmission command transmitted from the mobile terminal, the Internet means from the mobile terminal which has transmitted the Internet application command, and wherein the display application command is an Internet application.

* * * * *